(12) United States Patent
Sanchez

(10) Patent No.: US 7,252,470 B1
(45) Date of Patent: Aug. 7, 2007

(54) WHEEL LOCKING ASSEMBLY

(76) Inventor: Lorenzo Sanchez, 6969 W. Diversey Ave., Apt. 2, Chicago, IL (US) 60707

( * ) Notice: Subject to any disclaimer, the term of this patent is extended or adjusted under 35 U.S.C. 154(b) by 953 days.

(21) Appl. No.: 10/378,255

(22) Filed: Mar. 4, 2003

(51) Int. Cl.
*F16B 39/32* (2006.01)

(52) U.S. Cl. .......................... 411/85; 411/89; 411/911; 301/35.621

(58) Field of Classification Search ................ 411/84, 411/85, 89, 102, 910, 911, 402, 128, 978; 301/35.621, 35.623, 64.304; 81/121.1, 176.1, 81/176.5
See application file for complete search history.

(56) References Cited

U.S. PATENT DOCUMENTS

| | | | | |
|---|---|---|---|---|
| 1,484,689 A | * | 2/1924 | Walker | 411/89 |
| 1,975,796 A | * | 10/1934 | Miller et. al. | 40/202 |
| 2,172,272 A | * | 9/1939 | Booth | 83/687 |
| 2,421,201 A | * | 5/1947 | Hallock | 411/84 |
| 2,626,837 A | * | 1/1953 | Wilson et al. | 301/35.624 |
| 3,846,851 A | * | 11/1974 | Pepper | 4/255.4 |
| 4,106,541 A | * | 8/1978 | Gravert | 411/116 |
| 4,430,035 A | * | 2/1984 | Rodseth | 411/402 |
| 4,693,655 A | | 9/1987 | Omori | |
| 5,927,917 A | | 7/1999 | Gibbons | |
| 6,017,177 A | | 1/2000 | Lanham | |
| 6,053,681 A | | 4/2000 | Mattershead | |
| D432,006 S | | 10/2000 | Hussaini | |
| 6,273,658 B1 | | 8/2001 | Patterson et al. | |
| 6,450,746 B1 | * | 9/2002 | Kirimoto | 411/95 |

* cited by examiner

*Primary Examiner*—Flemming Saether

(57) ABSTRACT

A wheel locking assembly for preventing theft of wheels and tires. The wheel locking assembly includes a wheel rim assembly including a disc-shaped wheel rim having a first side and a second side, and also having an axle-receiving opening being centrally disposed therethrough, and further having fastener holes being spaced apart and being disposed therethrough, and also having cover-mounting holes being disposed therethrough; and also includes a fastener assembly including fasteners being lockingly disposed in the fastener holes of the disc-shaped wheel rim; and further includes a locking assembly being disposed in the disc-shaped wheel rim for locking the fasteners in the fastener holes; and also includes cover members being fastenably attached to the wheel rim.

5 Claims, 3 Drawing Sheets

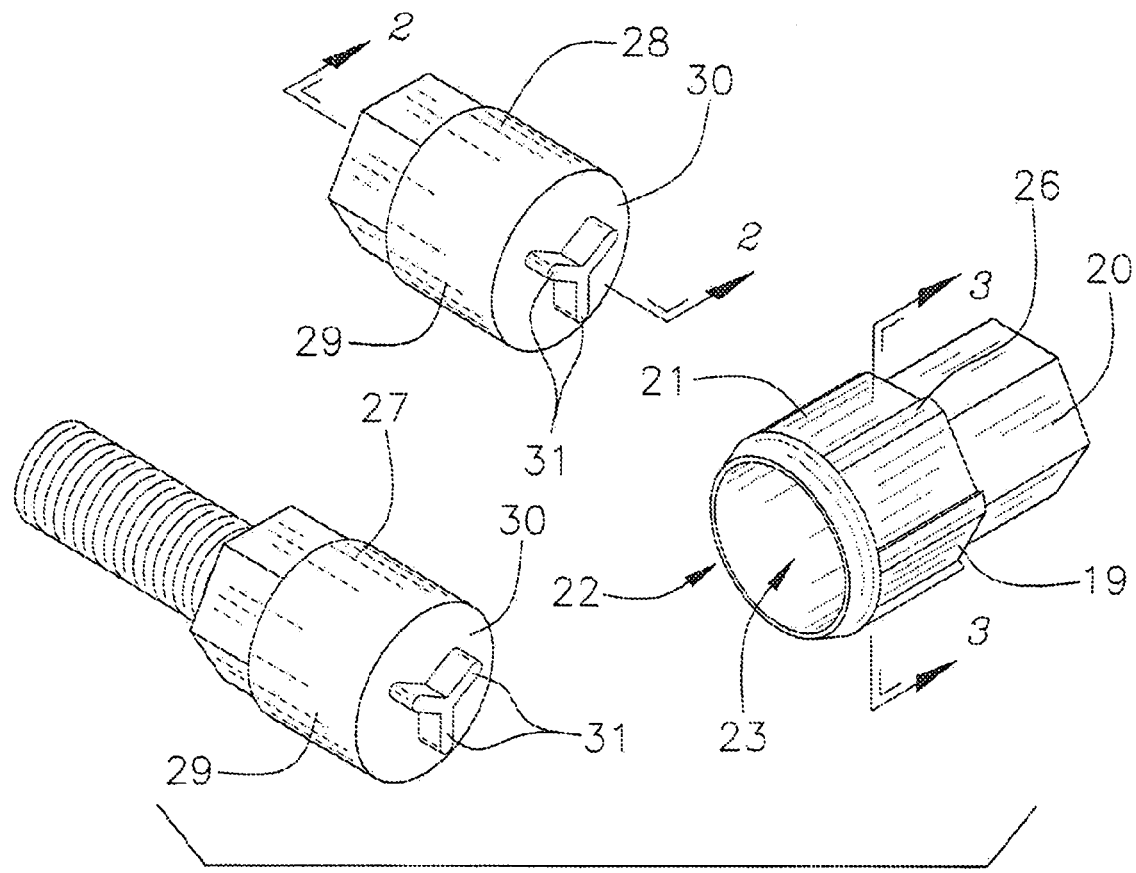
FIG. 1
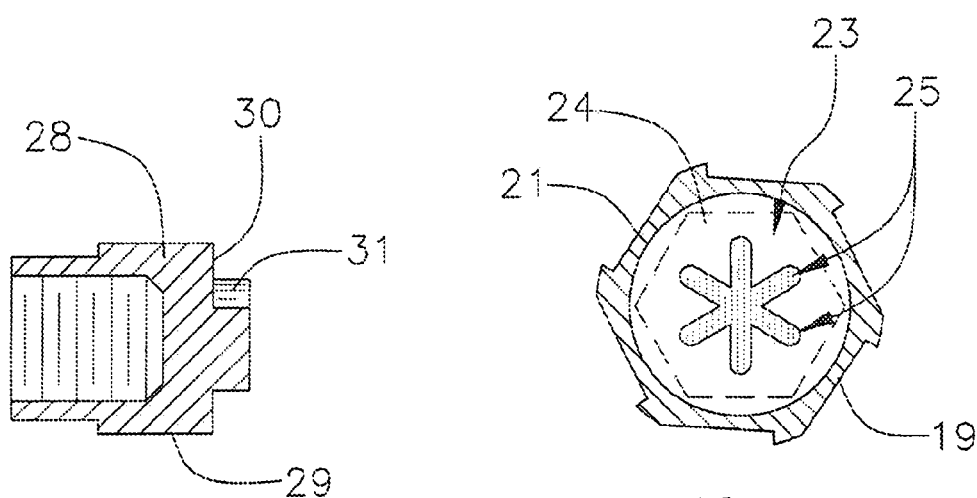
FIG. 2
FIG. 3

WHEEL LOCKING ASSEMBLY

BACKGROUND OF THE INVENTION

1. Field of the Invention

The present invention relates to wheel locks and more particularly pertains to a new wheel locking assembly for preventing theft of wheels and tires.

2. Description of the Prior Art

The use of wheel locks is known in the prior art. More specifically, wheel locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,017,177; U.S. Pat. No. 6,053,681; U.S. Pat. No. 4,693,655; U.S. Pat. No. 6,273,658; U.S. Pat. No. 5,927,917; and U.S. Pat. No. Des. 432,006.

While these devices fulfill their respective, particular objectives and requirements, the aforementioned patents do not disclose a new wheel locking assembly. The prior art includes fasteners having various shaped head portions and having threaded shaft portions.

SUMMARY OF THE INVENTION

The general purpose of the present invention, which will be described subsequently in greater detail, is to provide a new wheel locking assembly which has many of the advantages of the wheel locks mentioned heretofore and many novel features that result in a new wheel locking assembly which is not anticipated, rendered obvious, suggested, or even implied by any of the prior art wheel locks, either alone or in any combination thereof. The present invention includes a wheel rim assembly including a disc-shaped wheel rim having a first side and a second side, and also having an axle-receiving opening being centrally disposed therethrough, and further having fastener holes being spaced apart and being disposed therethrough, and also having cover-mounting holes being disposed therethrough; and also includes a fastener assembly including fasteners being lockingly disposed in the fastener holes of the disc-shaped wheel rim; and further includes a locking assembly being disposed in the disc-shaped wheel rim for locking the fasteners in the fastener holes; and also includes cover members being fastenably attached to the wheel rim. None of the prior art includes the combination of the elements of the present invention.

There has thus been outlined, rather broadly, the more important features of the wheel locking assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new wheel locking assembly which has many of the advantages of the wheel locks mentioned heretofore and many novel features that result in a new wheel locking assembly which is not anticipated, rendered obvious, suggested, or even implied by any of the prior art wheel locks, either alone or in any combination thereof.

Still another object of the present invention is to provide a new wheel locking assembly for preventing theft of wheels and tires.

Still yet another object of the present invention is to provide a new wheel locking assembly that is easy and convenient to use.

Even still another object of the present invention is to provide a new wheel locking assembly that is impossible to remove thus preventing the theft of expensive wheels and tires.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of fastening members of a new wheel locking assembly according to the present invention.

FIG. 2 is a longitudinal cross-sectional view of one of the fastening members of the present invention.

FIG. 3 is a lateral cross-sectional view of one of the fastening members of the present invention.

DESCRIPTION OF THE PREFERRED EMBODIMENT

Figure 4:
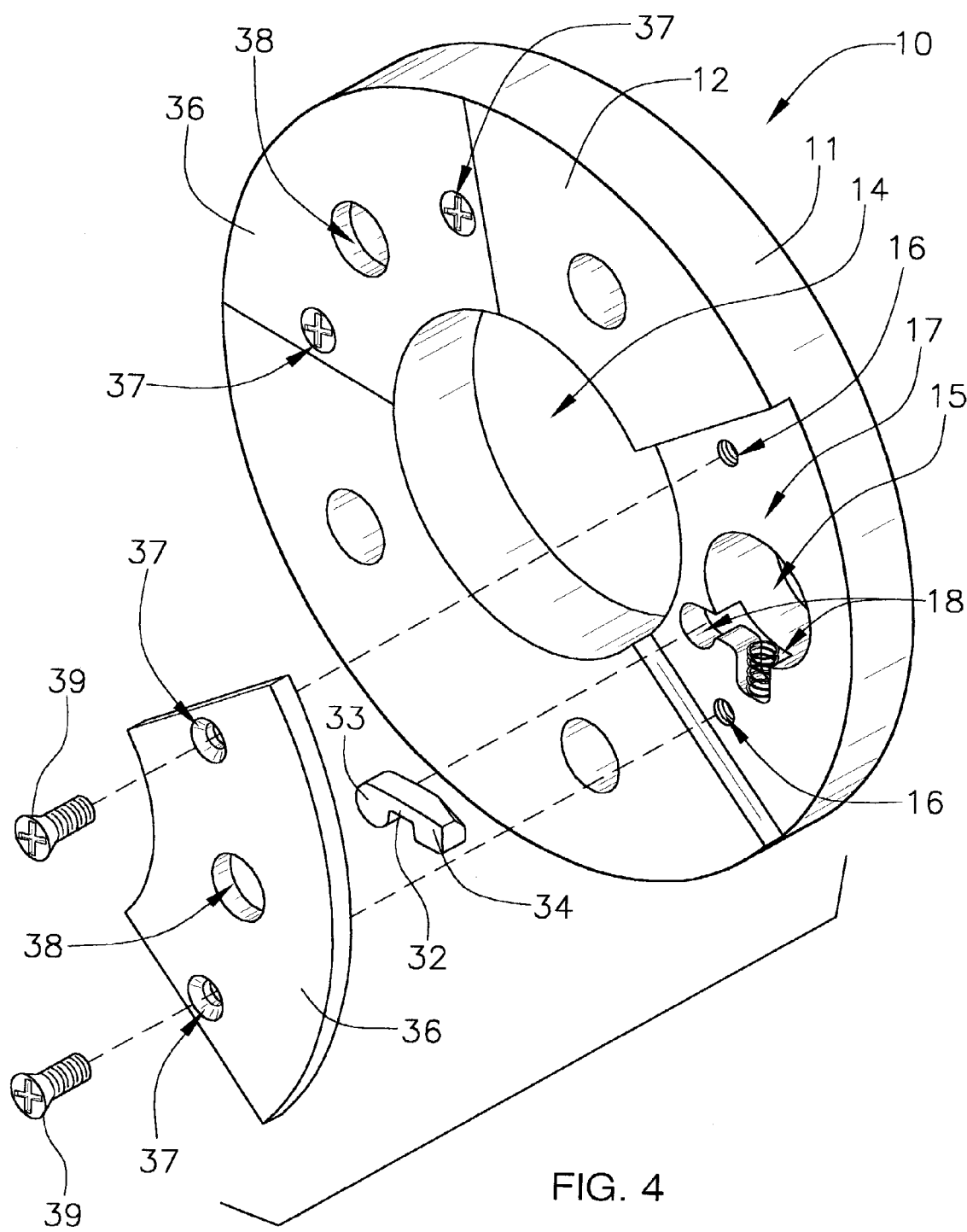
FIG. 4 is a partial exploded perspective view of a wheel rim, pawl, spring, cover plates of the present invention.
Figure 5:
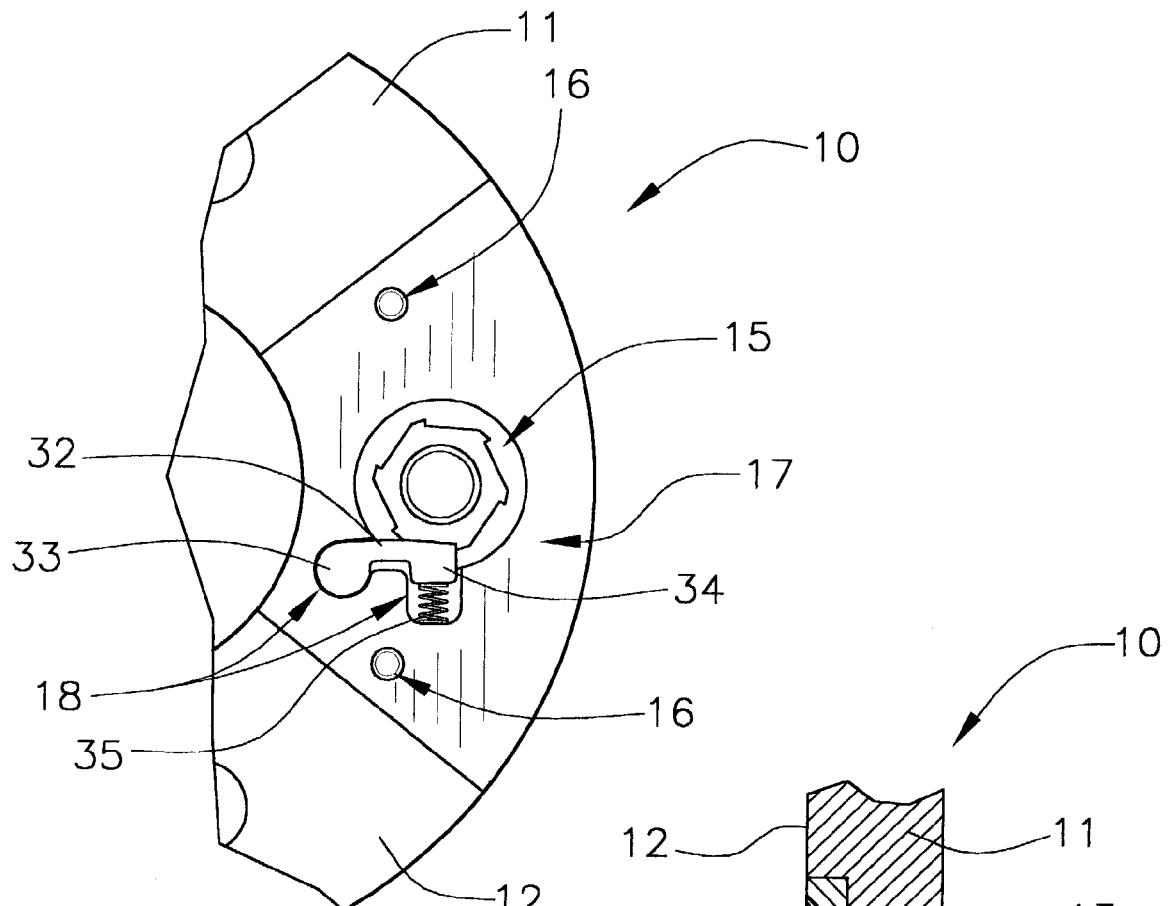
FIG. 5 is partial side elevational view of the present invention.
Figure 6:
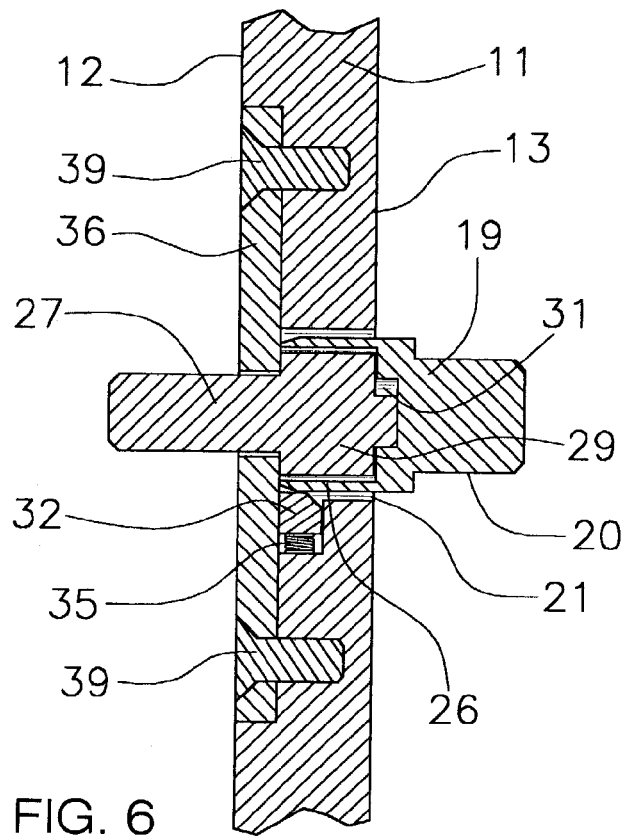
FIG. 6 is a cross-sectional view of the present invention.

With reference now to the drawings, and in particular to FIGS. 1 through 6 thereof, a new wheel locking assembly embodying the principles and concepts of the present invention and generally designated by the reference numeral 10 will be described.

As best illustrated in FIGS. 1 through 6, the wheel locking assembly 10 generally comprises a wheel rim assembly including a disc-shaped wheel rim 11 having a first side 12 and a second side 13, and also having an axle-receiving opening 14 being centrally disposed therethrough, and further having fastener holes 15 being spaced apart and being disposed therethrough, and also having cover-mounting holes 16 being disposed therethrough. The wheel rim 11 includes arc-shaped recessed areas 17 being circumferentially spaced and being disposed in the first side 12 thereof with selected fastener holes 15 being disposed in the arc-shaped recessed areas 17. The wheel rim 11 further includes pairs of lock-receiving slots 16 being disposed in walls defining the fastener holes 15 in the arc-shaped recessed areas 17.

A fastener assembly includes fasteners 19,27,28 being lockingly disposed in the fastener holes 15 of the disc-shaped wheel rim 11. The fasteners 19,27,28 include key members 19 being disposed in the fastener holes 15 in the arc-shaped recessed areas 17, and also include mail and female fasteners 27,28 being lockingly retained by the key members 19. Each key member 19 has a hexagonal-shaped head portion 20, and also has a tubular portion 21 having an open end 22 and a bore 23 being disposed therein, and further has radial slots 25 being disposed in an end wall 24 terminating the bore 23. The tubular portion 21 has a ratcheted outer surface 26. The male and female fasteners 27,28 are lockingly received in the bores 23 of the key members 19 and have head portions 29 with end walls 30, and also have ribs 31 each being conventionally disposed upon an outer side of a respective end wall 30 and being arranged in Y-shape and also being removably received in selected radial slots 25 of a respective key member 19.

A locking assembly is disposed in the disc-shaped wheel rim 11 for locking the fasteners 19,27,28 in the fastener holes 15. The locking assembly includes pawls 32 each having an enlarged slot-receiving portion 33 being disposed in one of the lock-receiving slots 18 of a respective pair of the lock-receiving slots 18, and also having a lever portion 34 being biasedly engageable to the ratcheted outer surface 26 of a respective key member 19; and also includes springs 35 each being disposed in another one of the lock-receiving slots 18 of a respective pair of the lock-receiving slots 18 and biasing the lever portion 34 into engagement with a respective key member 19 for the locking of the key member 19 in a respective fastener hole 15 of the wheel rim 11.

Cover members 36 are fastenably attached to the wheel rim 11. Each of the cover members 36 is an arc-shaped plate having mounting holes 37 being disposed therethrough near ends thereof, and also having a centrally-disposed hole 38 being disposed therethrough with each of the cover members 36 being fastenable with fastening members 39 in a respective arc-shaped recessed area 17 of the wheel rim 11 with the centrally-disposed hole 38 of the cover member 36 being aligned with the fastener hole 15 in the arc-shaped recessed area 17.

In use, the user would insert the fasteners 19,27,28 in the fastener holes 15 of the arc-shaped recessed areas 17 with the pawls 32 engaging the key members 19, and the user would then fasten the cover members 36 in the arc-shaped recessed areas 17 over the fasteners 19,27,28 to prevent theft of the wheels and tires.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the wheel locking assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel locking assembly comprising:
   a wheel rim assembly including a disc-shaped wheel rim having a first side and a second side, and also having an axle-receiving opening being centrally disposed therethrough, and further having fastener holes being spaced apart and being disposed therethrough, and also having cover-mounting holes being disposed there through, said wheel rim including arc-shaped recessed areas being circumferentially spaced and being disposed in said first side thereof, selected said fastener holes being disposed in said arc-shaped recessed areas, said wheel rim further including pairs of lock-receiving slots being disposed in walls defining said fastener holes in said arc-shaped recessed areas;
   a fastener assembly including fasteners being lockingly disposed in said fastener holes of said disc-shaped wheel rim, said fasteners including key members being disposed in said fastener holes in said arc-shaped recessed areas, and also including male and female fasteners being lockingly retained by said key members, each said key member having a hexagonal-shaped head portion, and also having a tubular portion having an open end and a bore being disposed therein, and further having radial slots being disposed in an end wall terminating said bore;
   a locking assembly being disposed in said disc-shaped wheel rim for locking said fasteners in said fastener holes; and
   cover members being fastenably attached to said disc-shaped wheel rim.

2. The wheel locking assembly as described in claim 1, wherein said tubular portion has a ratcheted outer surface.

3. The wheel locking assembly as described in claim 2, where in said male and female fasteners are lockingly received in said bores of said key members and have head portions with end walls, and also have ribs each being disposed upon an outer side of a respective said end wall and being arranged in Y-shape and also being removably received in selected said radial slots of a respective said key member.

4. The wheel locking assembly as described in claim 3, wherein said locking assembly includes pawls each having an enlarged slot-receiving portion being disposed in one of said lock-receiving slots of a respective said pair of said lock-receiving slots, and also having a lever portion being biasedly engageable to said ratcheted outer surface of a respective said key member; and also includes springs each being disposed in another one of said lock-receiving slots of a respective said pair of said lock-receiving slots and biasing said lever portion into engagement with a respective said key member for the locking of said key member in a respective said fastener hole of said wheel rim.

5. The wheel locking assembly as described in claim 4, wherein each of said cover members is an arc-shaped plate having mounting holes being disposed therethrough near ends thereof, and also having a centrally-disposed hole being disposed therethrough, each of said cover members being fastenable with fastening members in a respective said arc-shaped recessed area of said wheel rim with said centrally-disposed hole of said cover member being aligned with said hole in said arc-shaped recessed area.

* * * * *